(12) United States Patent
Smrha et al.

(10) Patent No.: US 8,315,497 B2
(45) Date of Patent: Nov. 20, 2012

(54) UNIVERSAL SLIDING ADAPTER PACK

(75) Inventors: Mark Smrha, Burnsville, MN (US);
Chad James Sjodin, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 539 days.

(21) Appl. No.: 12/590,498

(22) Filed: Oct. 26, 2009

(65) Prior Publication Data

US 2010/0129039 A1       May 27, 2010

Related U.S. Application Data

(60) Provisional application No. 61/197,564, filed on Oct. 27, 2008.

(51) Int. Cl.
*G02B 6/00* (2006.01)
(52) U.S. Cl. ......... 385/134; 385/136; 385/137; 385/139
(58) Field of Classification Search .................. None
See application file for complete search history.

(56) References Cited

U.S. PATENT DOCUMENTS

| | | |
|---|---|---|
| 5,238,426 A | 8/1993 | Arnett |
| 5,497,444 A | 3/1996 | Wheeler |
| 6,591,051 B2 | 7/2003 | Solheid et al. |
| 6,715,619 B2 | 4/2004 | Kim et al. |
| 6,944,387 B2 | 9/2005 | Howell et al. |
| 2003/0063866 A1 | 4/2003 | Melton et al. |
| 2003/0095772 A1* | 5/2003 | Solheid et al. ............... 385/134 |
| 2004/0011750 A1* | 1/2004 | Kim et al. ...................... 211/26 |
| 2006/0169856 A1 | 8/2006 | Dorenkamp et al. |
| 2007/0025675 A1 | 2/2007 | Kramer |

FOREIGN PATENT DOCUMENTS

WO       WO 95/20175       7/1995

OTHER PUBLICATIONS

International Search Report and Written Opinion mailed Jun. 25, 2010.

* cited by examiner

*Primary Examiner* — Charlie Peng
*Assistant Examiner* — Mary El Shammaa
(74) *Attorney, Agent, or Firm* — Merchant & Gould P.C.

(57) ABSTRACT

A sliding adapter pack having a plurality of cartridge. Each cartridge being slidable relative to a mounting fixture and independent of the other cartridges. Each cartridge defining a front opening constructed to receive at least four different types of adapters including a quad LC adapter, a duplex LC adapter, a duplex SC adapter, and a simplex SC adapter. Each cartridge further having a snap-fit construction that permits assembly of the cartridge without the use of tools.

6 Claims, 12 Drawing Sheets

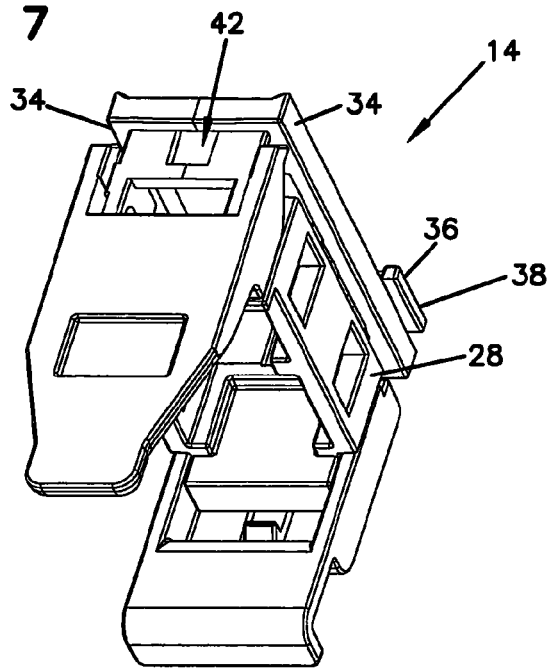
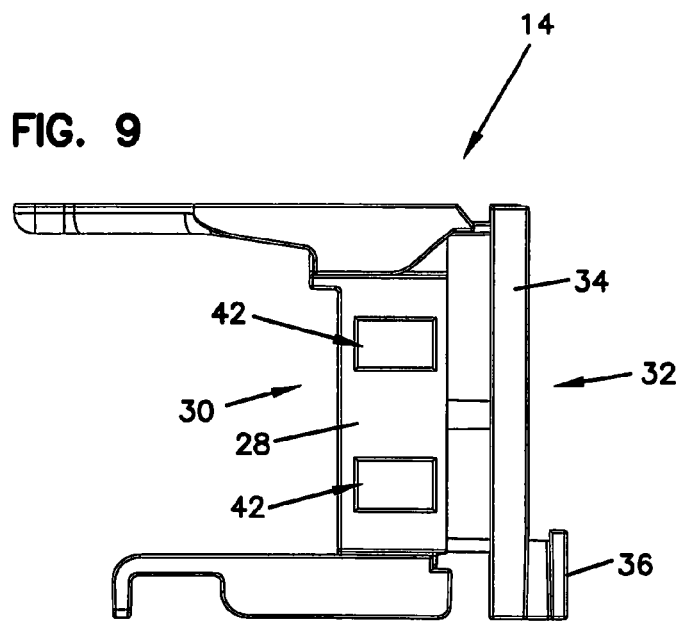
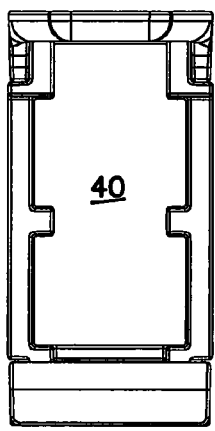

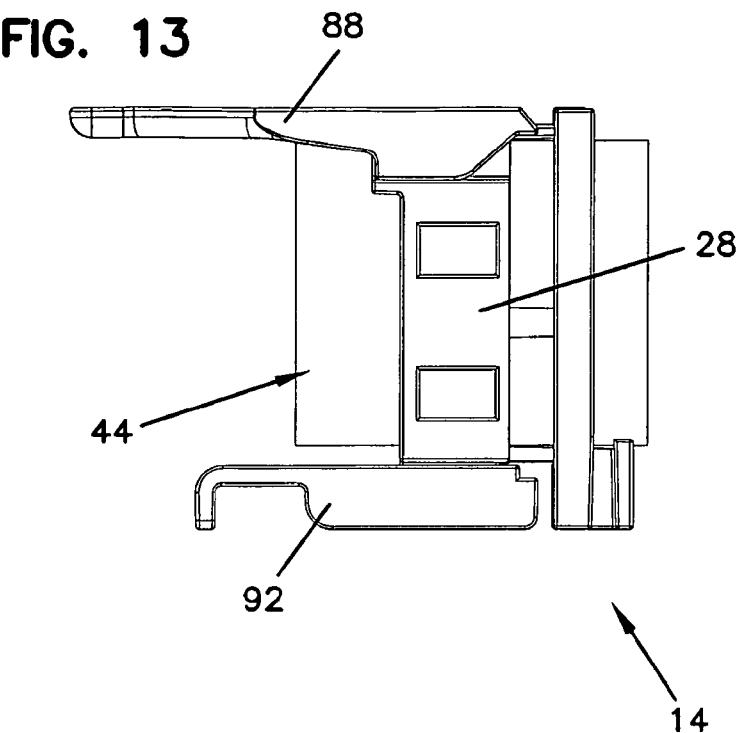
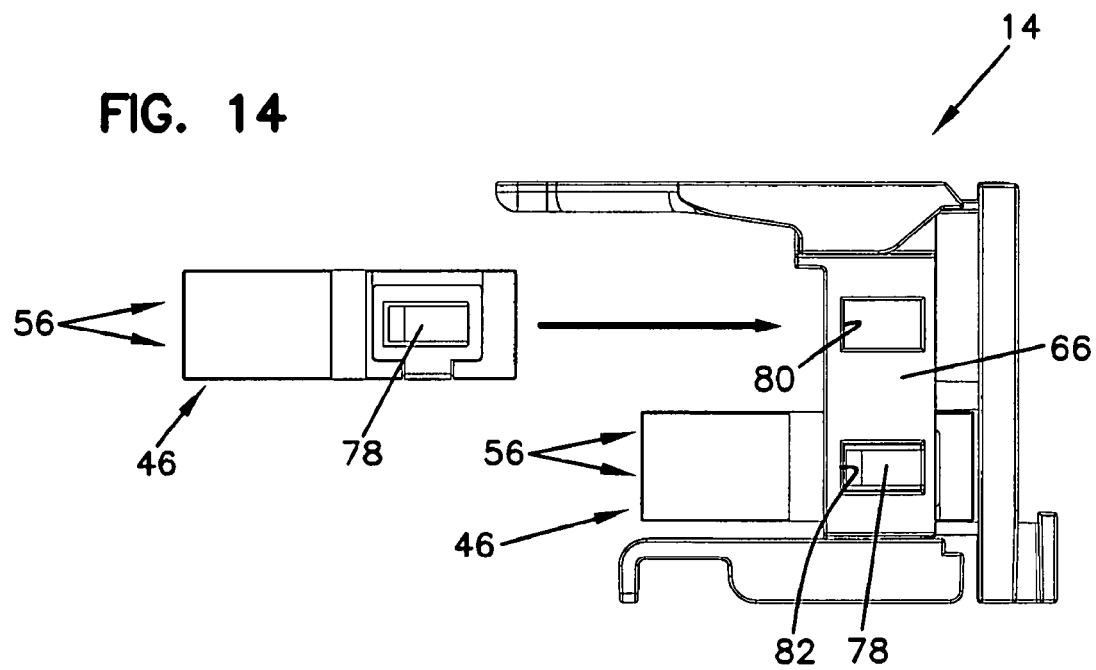

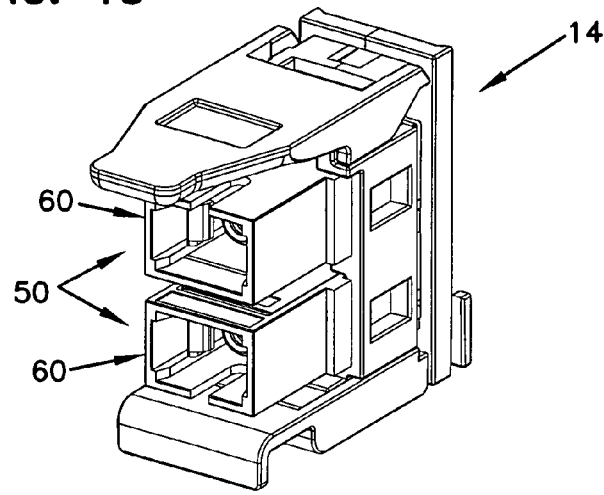
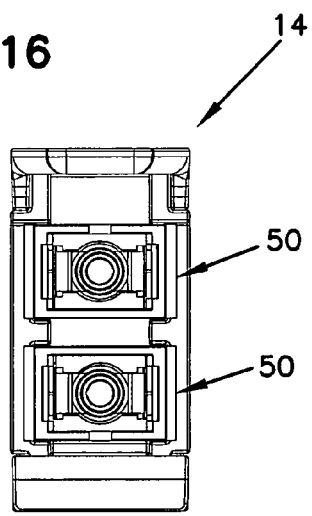
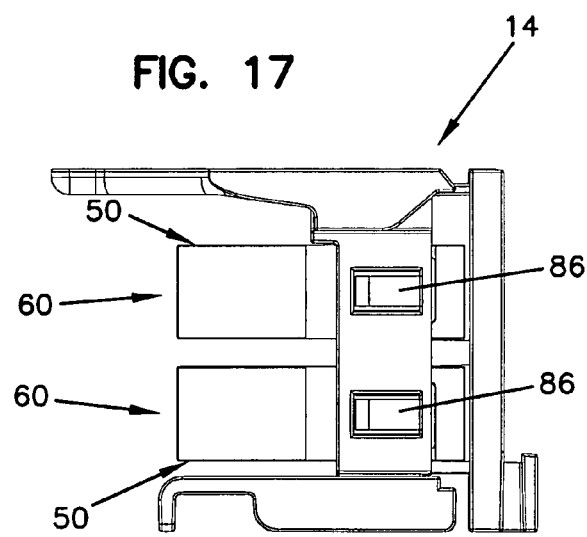

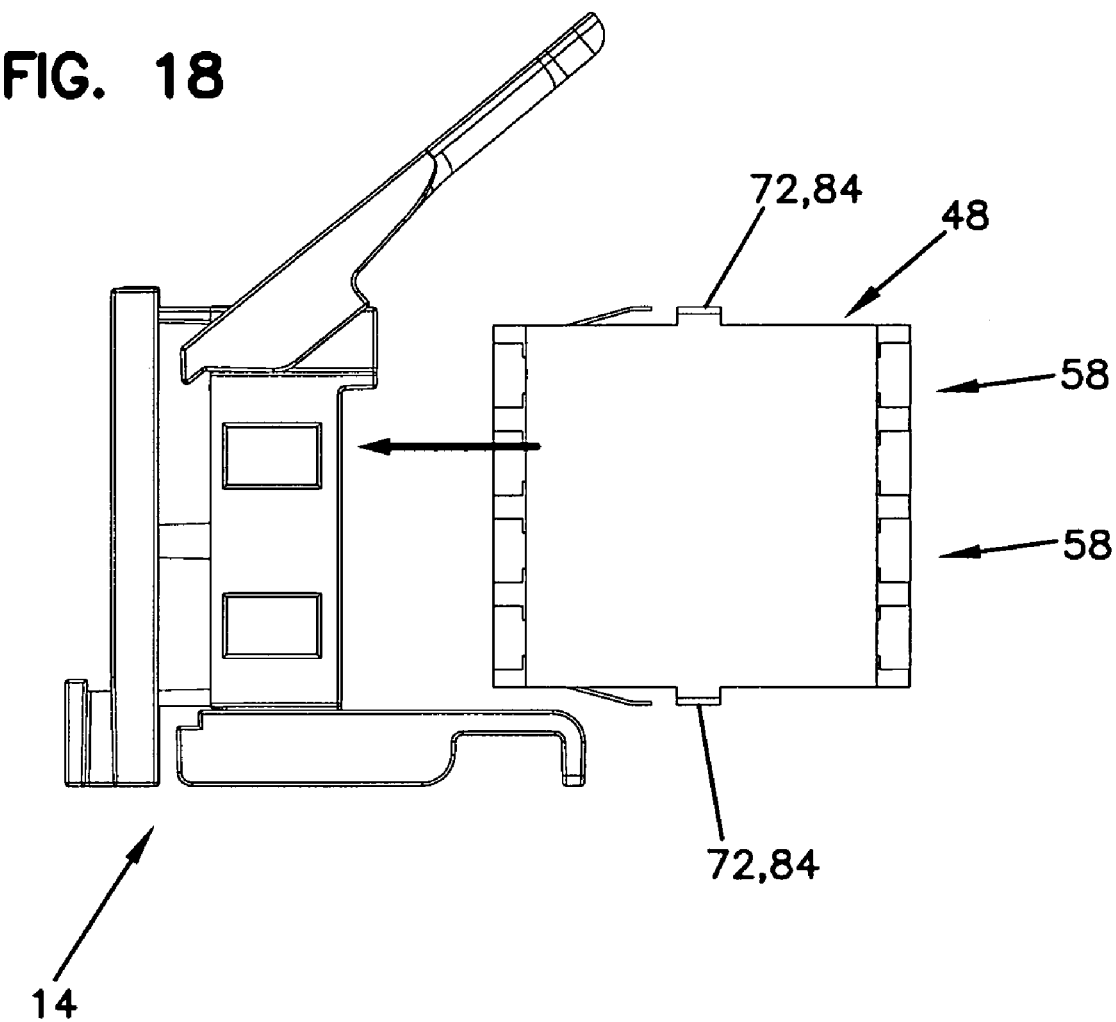

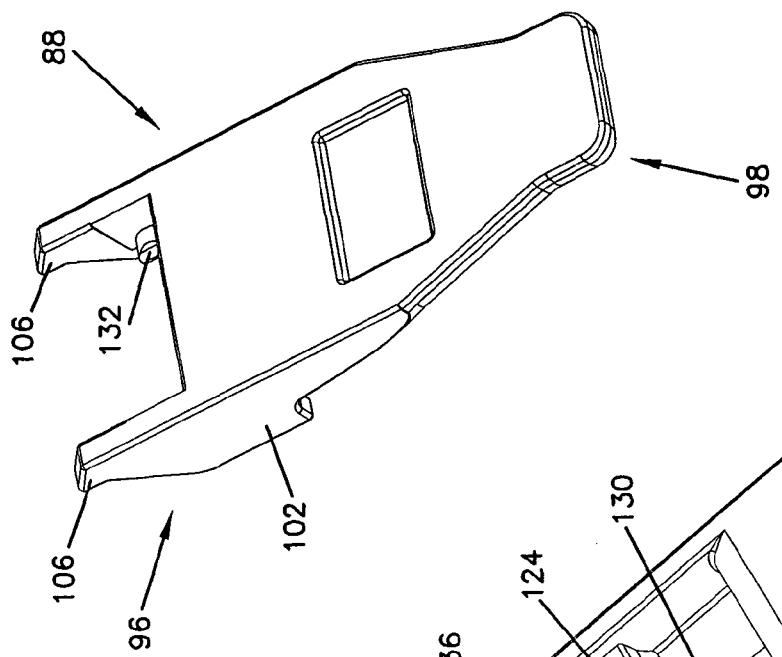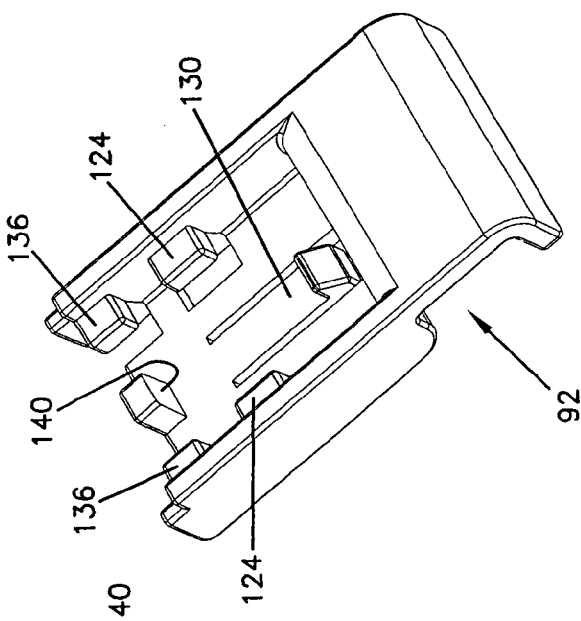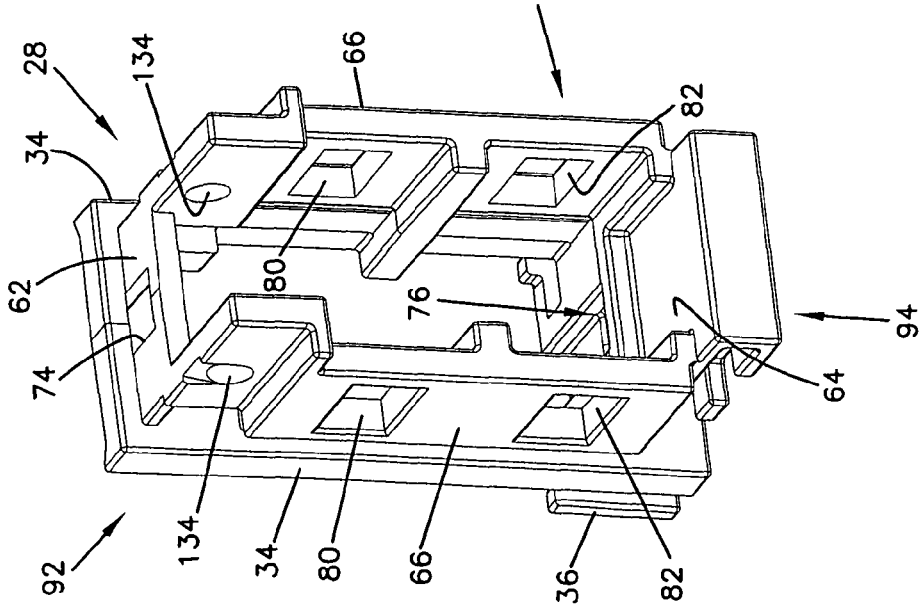

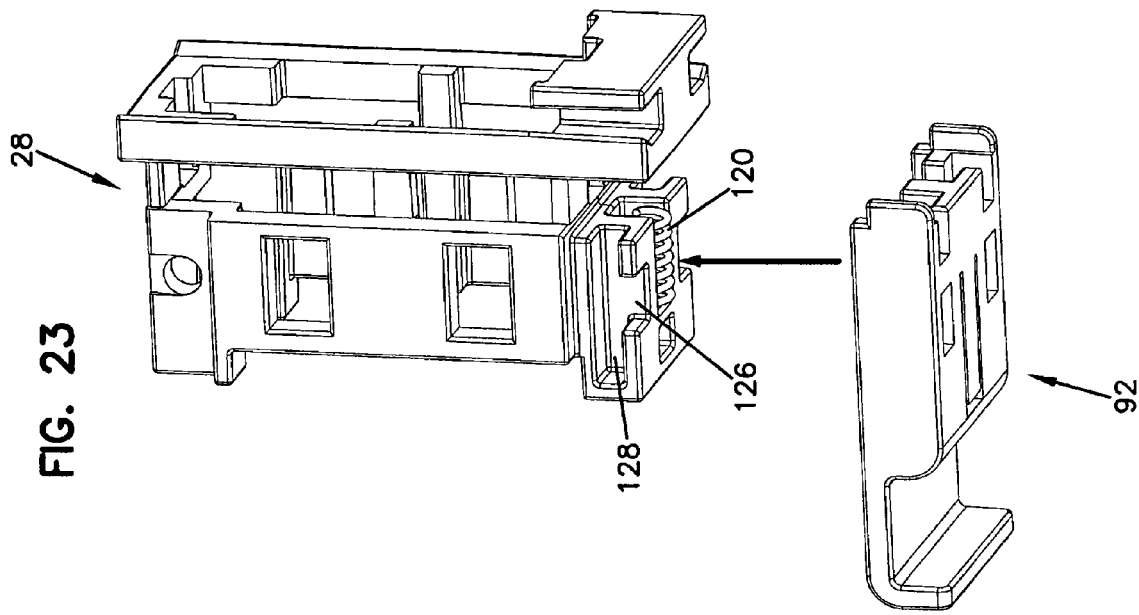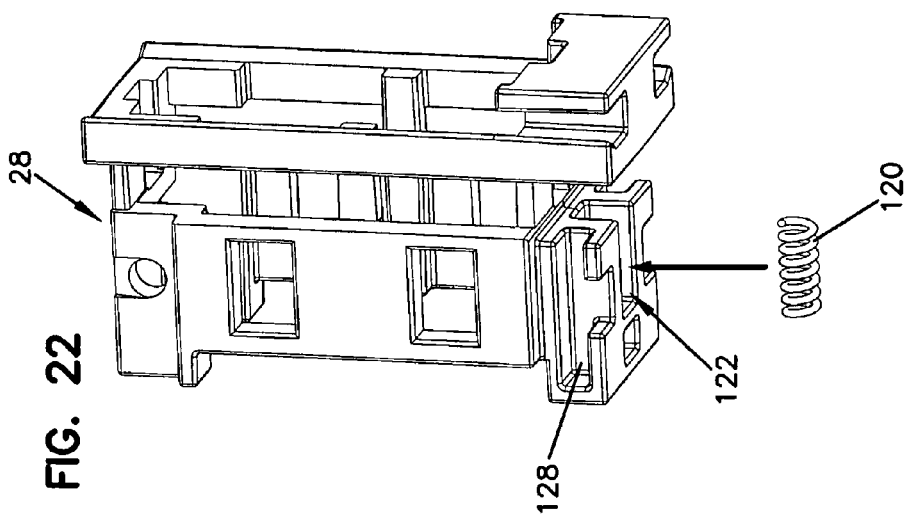

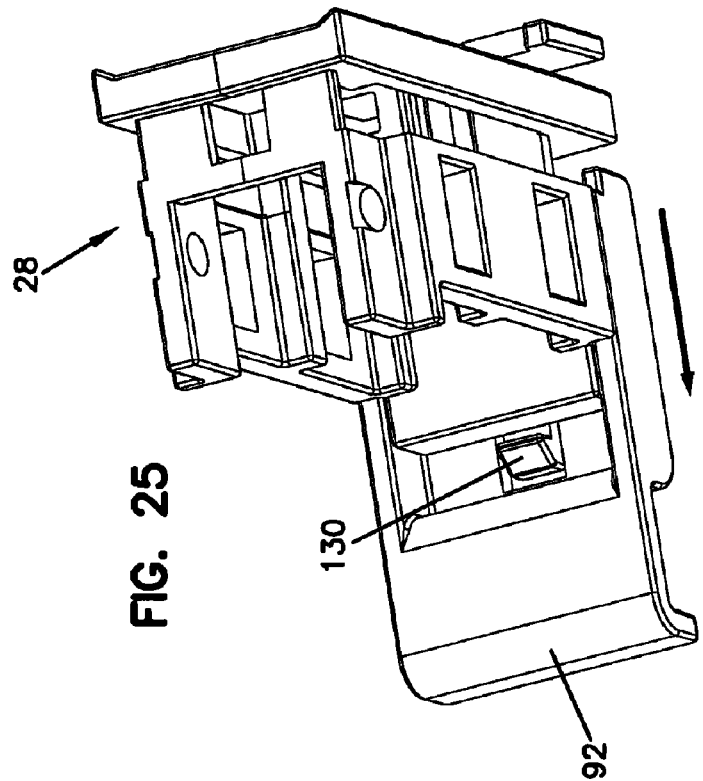
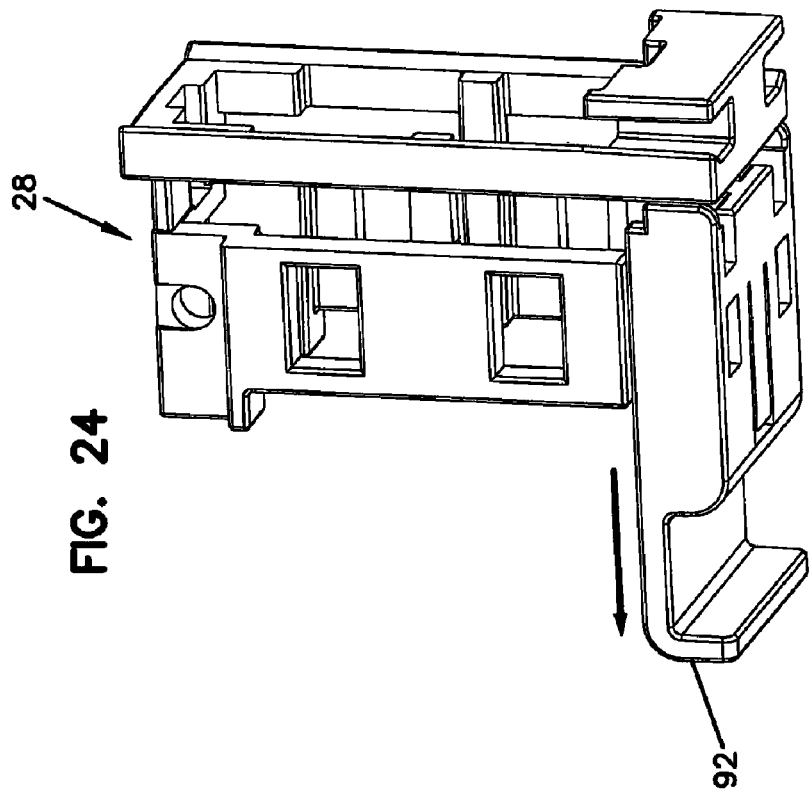

UNIVERSAL SLIDING ADAPTER PACK

CROSS-REFERENCE TO RELATED APPLICATIONS

This application claims the benefit of U.S. Provisional Application Ser. No. 61/197,564, filed Oct. 27, 2008; which application is incorporated herein by reference.

FIELD OF THE TECHNOLOGY

The present disclosure relates generally to devices for use in the telecommunications industry, and various methods associated with such devices. More particularly, this disclosure relates to devices for use with fiber optic cable adapters, and various methods associated with such devices.

BACKGROUND

Telecommunication systems utilize fiber optic cables to connect together pieces of telecommunications equipment. Because of the large number of cable connections associated with such telecommunication systems, effective management of those connections is crucial. Ease of access to connections, as well as the ability to utilize such connecting devices in a number of different applications, are factors related to effective management. In general, conventional arrangements for managing the connections of fiber optic cables can be improved.

SUMMARY

One aspect of the present disclosure relates to a sliding adapter pack having a plurality of cartridges. Each cartridge of the adapter pack is slidable relative to a mounting fixture and independent of the other cartridges. Each cartridge defining a front opening constructed to receive at least four different types of adapters including a quad LC adapter, a duplex LC adapter, a duplex SC adapter, and a simplex SC adapter. Another aspect of the present disclosure relates to sliding adapter cartridges that have a snap-fit construction that permits assembly of the cartridges without the use of tools.

A variety of examples of desirable product features or methods are set forth in part in the description that follows, and in part will be apparent from the description, or may be learned by practicing various aspects of the disclosure. The aspects of the disclosure may relate to individual features as well as combinations of features, including combinations of features disclosed in separate embodiments. It is to be understood that both the foregoing general description and the following detailed description are explanatory only, and are not restrictive of the claimed invention.

BRIEF DESCRIPTION OF THE DRAWINGS

FIG. 7 is a top perspective view of one of the cartridges of the universal sliding adapter pack of FIG. 1, shown in isolation;

FIG. 8 is a front elevation view of the cartridge of FIG. 7;

FIG. 9 is a side elevation view of the cartridge of FIG. 8;

FIG. 13 is a side elevation view of the cartridge of FIG. 12;

FIG. 14 is a side elevation view of the cartridge of FIG. 7, illustrated with two duplex LC adapters being received within the front opening of the cartridge, or in the alternative, illustrated with two simplex SC adapters being received within the front opening of the cartridge;

FIG. 15 is a side perspective view of the cartridge of FIG. 7, illustrated with two simplex SC adapters received within the front opening of the cartridge;

FIG. 16 is a front elevation view of the cartridge of FIG. 15;

FIG. 17 is a side elevation view of the cartridge of FIG. 16;

FIG. 18 is a side elevation view of the cartridge of FIG. 7, illustrated with a duplex SC adapter being received within the front opening of the cartridge, or in the alternative, illustrated with the quad LC adapter of FIG. 11 being received within the front opening of the cartridge;

FIG. 19 is a front perspective view of an adapter cage of the cartridge of FIG. 7, shown in isolation;

FIG. 20 is a top perspective view of the tab of the cartridge of FIG. 7, shown in isolation;

FIG. 21 is a top perspective view of a base of the cartridge of FIG. 7, shown in isolation;

FIG. 22 is a side perspective view of a spring being inserted into a pocket formed in the adapter cage during assembly of the cartridge of FIG. 7;

FIG. 23 is a side perspective view of the base being positioned relative to the adapter cage during assembly of the cartridge of FIG. 7;

FIG. 24 is a side perspective view of the base being slid forward relative to the adapter cage during assembly of the cartridge of FIG. 7;

FIG. 25 is a top perspective view of the base being slid forward relative to the adapter cage during assembly of the cartridge of FIG. 7.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
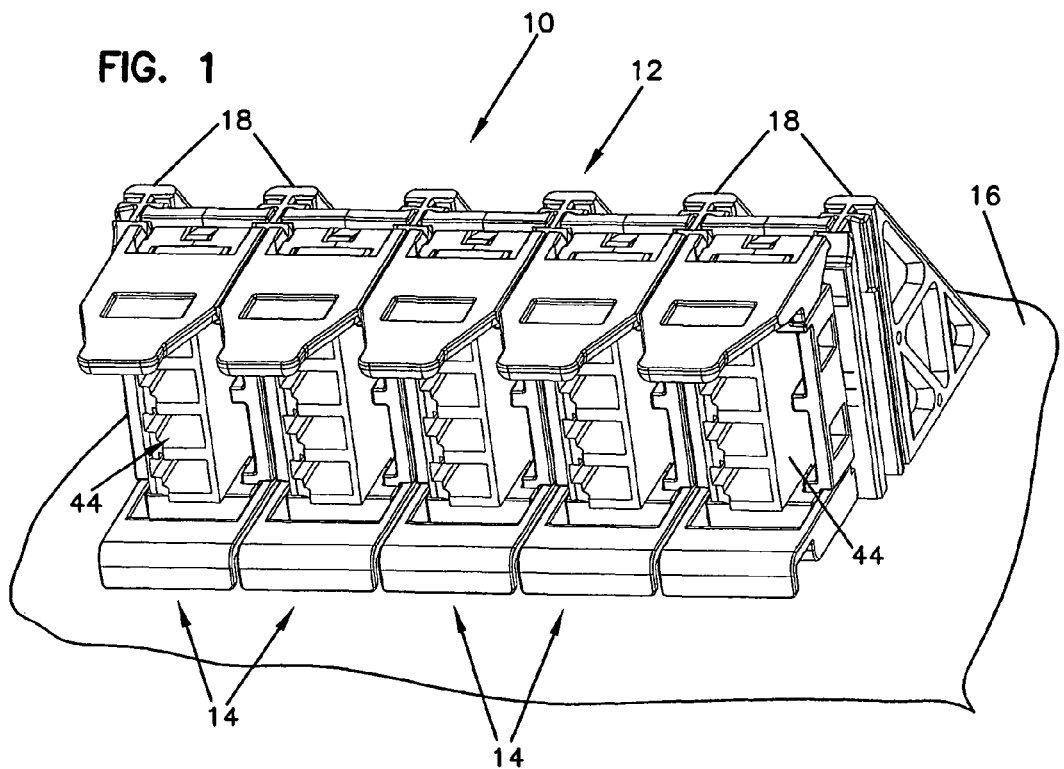
FIG. 1 is a front perspective view of a universal sliding adapter pack, in accordance with the principles disclosed, the universal sliding adapter pack including a plurality of cartridges mounted to a mounting fixture.

Referring to FIG. 1, one embodiment of a sliding adapter pack 10 is illustrated. The sliding adapter pack 10 generally includes a mounting fixture 12 and a plurality of cartridges 14 mounted to the fixture. Each cartridge 14 is slidable relative to the fixture 12 and independent of the other cartridges 14. The cartridges 14 carry adapters (e.g., 44) that provide connections between fiber optic cables. The cartridges 14 slide on the fixture to allow a user to separate one cartridge 14 from the group of cartridges 14 to access the adapters of that particular cartridge 14 more easily. The present sliding adapter pack 10 is further universal; that is, the adapter pack 10 is designed to carry a variety of different types of adapters. The present cartridge 14 of the sliding adapter pack 10 also has a snap-together construction that reduces costs associated with the manufacture of the sliding adapter pack 10.

The mounting fixture 12 of the sliding adapter pack 10 is constructed to mount to a planar surface 16, such as a planar surface of a sliding drawer, for example. The mounting fixture 12 can be mounted to other surfaces of other structures, such as cabinets, racks, and other enclosures or frame structures, in accordance with the principles disclosed.

Figure 3:
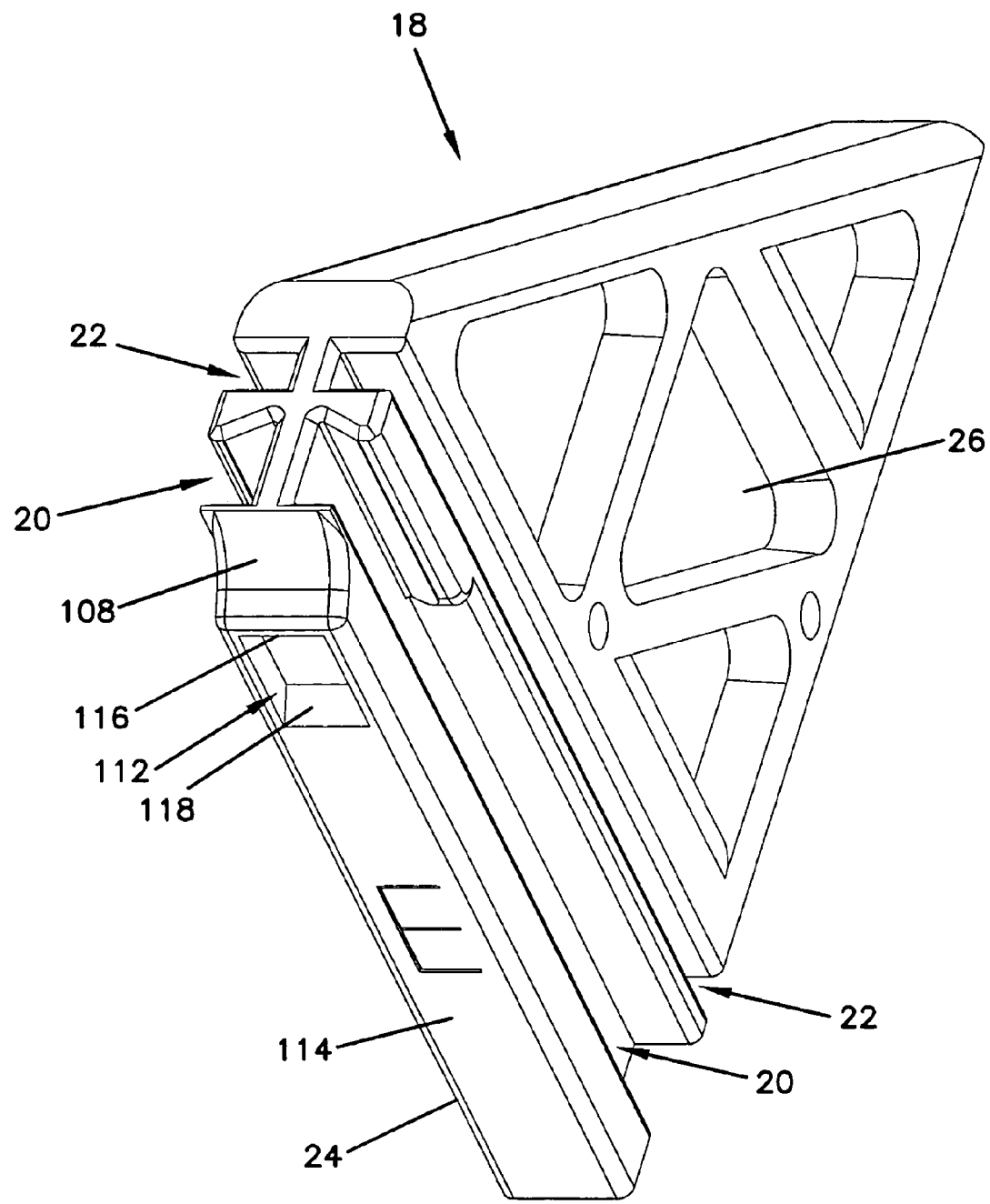
FIG. 3 is a top perspective view of a fixture bracket of the mounting fixture of the universal sliding adapter pack of FIG. 1.

Referring now to FIGS. 1 and 3, the mounting fixture 12 generally includes a number of fixture brackets 18. One fixture bracket 18 is shown isolation in FIG. 3. The fixture bracket 18 includes a triangular base portion 26 and an upright member 24 integrally attached to the triangular base portion 26. Frontward grooves 20 are formed in the upright member 24 at both sides of the bracket 18. Rearward grooves 22 are defined between the upright member 24 and the triangular base portion 26 at both sides of the bracket 18.

Figure 2:
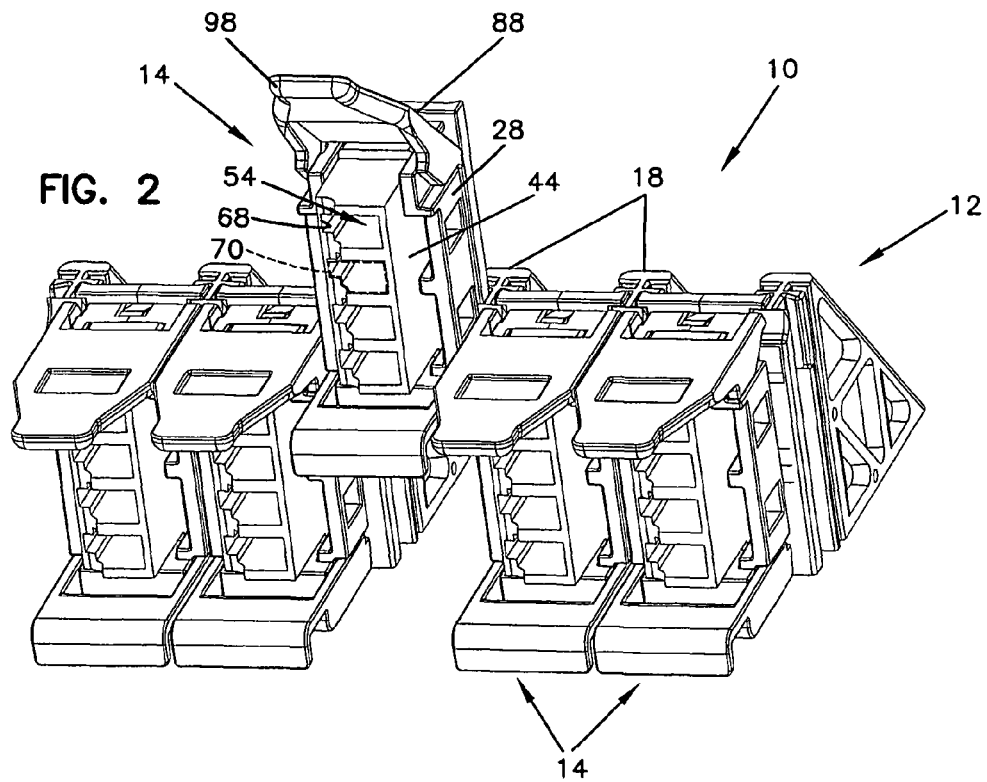
FIG. 2 is a front perspective view of the universal sliding adapter pack of FIG. 1, showing one of the cartridges of the adapter pack in an upward access position.

As illustrated in FIGS. 1 and 4-6, each one cartridge 14 is slidingly mounted to two fixture brackets 18, and each one of the fixture brackets 18 can slidingly receive two cartridges 14. In the illustrated embodiment of FIG. 2, the sliding adapter pack 10 includes five cartridges 14 slidingly secured to six fixture brackets 18. As can be understood, the sliding adapter pack 10 can include a greater or lesser number of cartridges 14, and a different corresponding number of fixture brackets 18.

Referring now to FIGS. 7-10, each cartridge 14 of the present disclosure generally includes an adapter cage 28. The adapter cage 28 has a front 30 (FIG. 9) and a rear 32. One guide rail 34 (FIGS. 7 and 10) is located at each side of the adapter cage 28 adjacent to the rear 32. A back support plate 36 is also located at the rear 32 of the adapter cage 28. Referring back to FIG. 3, opposing frontward grooves 20 of two fixture brackets 18 each receive one of the two guide rails 34 of the cartridge 14 (see also FIG. 6). Opposing rearward grooves 22 of the two fixture brackets 18 each receive an edge 38 of the back support plate 36 of the cartridge 14. The guide rails 34 and the edges 38 of the back support plate 36 of the cartridge 14 slide up and down within the grooves 20, 22 of the fixture bracket 18 to selectively provide access to adapters carried by the cartridge 14.

Figure 11:
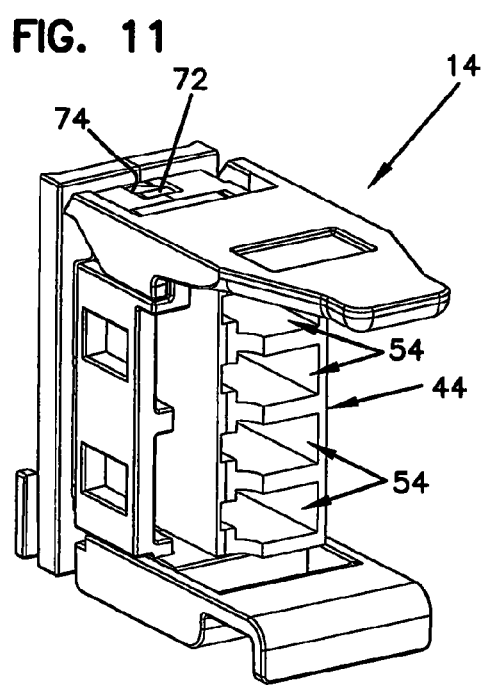
FIG. 11 is a side perspective view of the cartridge of FIG. 7, illustrated with a quad LC adapter received within a front opening of the cartridge.
Figure 12:
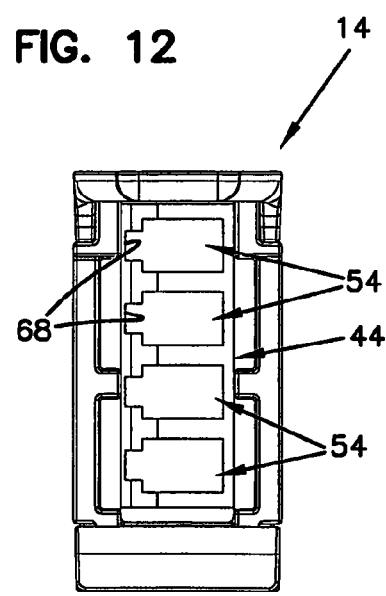
FIG. 12 is a front elevation view of the cartridge of FIG. 11.

The adapter cage 28 further defines a front opening 40 (FIG. 8) sized to receive different types of adapters, and attachment structure 42 (FIGS. 7 and 9) to which each different type of adapter secures. The opening 40 and attachment structure 42 of the adapter cage 28 are constructed so that the cartridge 14 can be used in a variety of applications that may require the use of different adapters. In the illustrated embodiment, the adapter cage 28 of the cartridge 14 is sized and arranged to receive each one of a number of adapter types including: a quad LC adapter 44 (FIGS. 11-13), duplex LC adapters 46 (represented in FIG. 14), a duplex SC adapter 48 (represented in FIG. 18), and simplex SC adapters 50 (FIGS. 15-17).

The quad LC adapter 44 (FIG. 11) is an adapter known in the telecommunications industry that has four LC connector openings 54. The quad LC adapter 44 has a single monolithic construction with the four LC connector openings 54 arranged in a single linear array. The duplex LC adapter 46 (FIG. 14) is an adapter known in the telecommunications industry that has two LC connector openings 56 (like the openings 54 of the quad LC adapter). The duplex LC adapter 46 has a single monolithic construction with the two LC connector openings 56 arranged side-by-side or stacked upon one another, depending upon the orientation of the adapter.

The simplex SC adapter 50 (FIG. 15) is an adapter known in the telecommunications industry that has only a single SC connector opening 60. The duplex SC adapter 48 (FIG. 18) is an adapter known in the telecommunications industry that has two SC connector openings 58 (like the openings 60 of the simplex SC adapter). The duplex SC adapter 48 has a single monolithic construction with the two SC connector openings 58 arranged side-by-side or stacked upon one another, depending upon the orientation of the adapter. An SC connector opening has a cross-sectional area that is generally larger in size than an LC connector opening.

The physical structure (e.g., opening size and attachment elements) of the above described adapters are standardized within the industry. Referring to FIG. 19, the opening 40 of the present cartridge 14 is defined by frame members, including a top frame member 62, a bottom frame member 64, and side frame members 66. The frame members 62, 64, 66 are universally designed to receive and secure one or more of each of the above described adapters. In particular, the cartridge 14 can selectively receive and secure one quad LC adapter 44, two duplex LC adapters 46, one duplex SC adapters 48, or two simplex SC adapters 50.

Referring back to FIGS. 11-13, the quad LC adapter 44 is received in the opening 40 of the cartridge 14 with the linear array of LC connector openings 54 oriented in a vertical orientation. This vertical orientation significantly improves finger access to the individual LC connectors that are received within the LC connector openings. For example and referring to FIG. 2, adapter slots 68 (see also FIG. 12) that receive release tabs 70 (schematically represented in FIG. 2) of LC connectors are directed toward the side of the cartridge 14, as opposed to being directed toward the bottom or the top of the cartridge 14. This provides finger space that allows the user to more easily grasp the release tab 70 to remove the connector from the connector opening 54. Standardized attachment structure of quad LC adapters 44 includes flexible tabs or elements 72 located at opposite ends of the adapter (see FIG. 11; see also FIG. 18 of the duplex SC adapter 48 having the same flexible element design). The attachment structure 42 of the cartridge 14 includes a first aperture 74 (FIG. 19) formed in the top frame member 62 that receives one of the flexible elements 72 in a snap-fit manner and a second aperture 76 formed in the bottom frame member 64 that receives the other of the flexible elements 72 in a snap-fit manner.

Referring to FIG. 14, the cartridge 14 is illustrated with two duplex LC adapters 46. The two duplex LC adapters 46 are received with the opening 40 such that the four LC connector openings 56 are oriented in a vertical linear array. This vertical orientation significantly improves finger access to the individual LC connectors that are received within the LC connector openings 56. For example and as previously described with respect to FIG. 2, adapter slots that receive release tabs of the LC connectors are directed toward the side so that a user's fingers can more easily grasp the tab to remove the connector from the connector opening. Standardized attachment structure of duplex LC adapters includes flexible tabs or elements 78 different than that of the quad LC adapter 44; the flexible elements 78 of the duplex LC adapters 46 are also located at opposite sides of the adapter orthogonal to the opposite ends of the quad LC adapter 44. Referring to FIG.

19, the attachment structure 42 of the cartridge 14 includes a pair of upper apertures 80 formed in each of the side frame members 66 that receives the flexible elements 78 of one of the duplex LC adapters 46 in a snap-fit manner, and a pair of lower apertures 82 formed in each of the side frame members 66 that receives the flexible elements 78 of the other of the duplex LC adapters 46 in a snap-fit manner.

Referring to FIG. 18, the cartridge 14 is illustrated with a duplex SC adapter 48. The duplex SC adapter 48 is received in the opening 40 of the cartridge 14 with the two SC connector openings 58 oriented in a vertical linear array. With regards to the orientation of the release tabs of the SC connectors received within the SC connector openings 58, finger access is not as problematic because SC connectors are larger in size and therefore less compact and dense than LC connectors. Standardized attachment structure of duplex SC adapters 48 includes flexible tabs or elements 84 located at opposite ends of the adapter. (The flexible elements 84 of the duplex SC adapters 48 have the same configuration as the elements 72 of the quad LC adapters 44.) The first aperture 74 (FIG. 19) formed in the top frame member 62 of the adapter cage 28 receives one of the flexible elements 84 in a snap-fit manner and the second aperture 76 formed in the bottom frame member 64 receives the other of the flexible elements 84 in a snap-fit manner.

Referring to FIGS. 15-17, the cartridge 14 is illustrated with two simplex SC adapters 50. The two simplex SC adapters 50 are received with the opening 40 such that the two SC connector openings 60 are oriented in a vertical linear array. Standardized attachment structure of simplex SC adapters 50 includes flexible elements 86 different than that of the duplex SC adapter 48; the flexible elements 86 of the simplex SC adapters 50 are also located at opposite sides of the adapter orthogonal to the opposite ends of the duplex SC adapter 48. (The flexible elements 86 of the simplex SC adapters 50 have the same configuration as the elements 78 (FIG. 14) of the duplex LC adapters 46.) The pair of upper apertures 80 (FIG. 19) formed in each of the side frame members 66 of the adapter cage 28 receives the flexible elements 86 of one of the simplex SC adapters 50 in a snap-fit manner, and the pair of lower apertures 82 formed in each of the side frame members 66 receives the flexible elements 86 of the other of the simplex SC adapters 50 in a snap-fit manner.

While each of the above arrays of connector openings (e.g., 54, 56, 58, 60) defined by the one or more adapters (e.g., 44, 46, 48, 50) of the cartridge is described as a "vertical" array, it is to be understood that this general direction is dependent upon the orientation of the mounting fixture 12 and the surface 16 to which the sliding adapter pack 10 is mounted. The arrays of connector openings can be horizontal arrays or angled arrays if the sliding adapter pack is mounted on a vertical surface or an angle surface.

Referring back to FIGS. 4-6, each universal cartridge 14 of the present sliding adapter pack 10 further includes a tab 88 attached to a first top end 90 of the adapter cage 28 and a base 92 attached to a second bottom end 94 of the adapter cage 28. The tab 88 is used to slide the cartridge 14 from a first position to a second position to access the adapters mounted within and carried by the cartridge 14; the base 92 is used to lock the cartridge 14 in the second access position.

Figure 6:
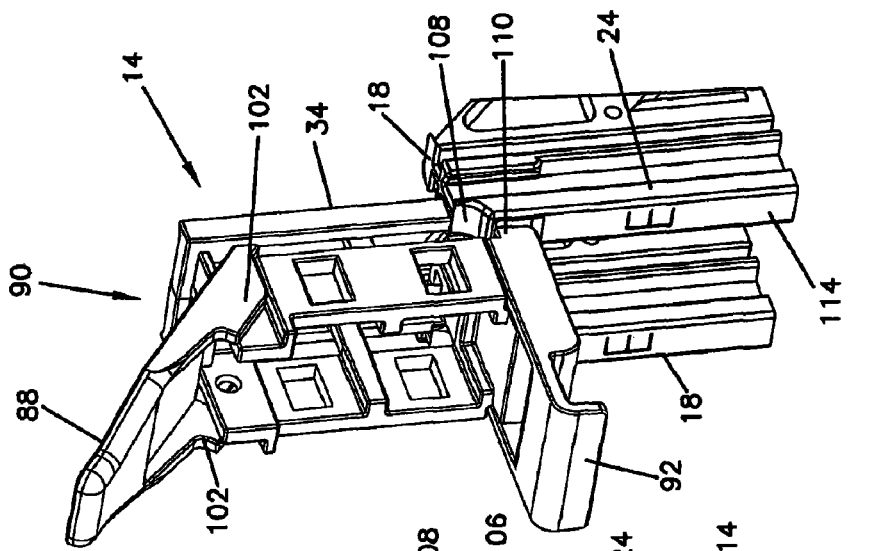
FIG. 6 is a front perspective view of the cartridge of FIG. 4, illustrated in the upward access position.
Figure 5:
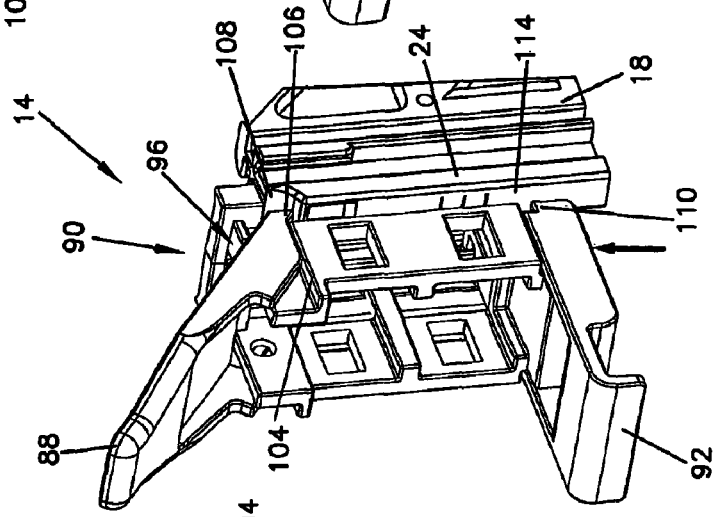
FIG. 5 is a front perspective view of the cartridge of FIG. 4, illustrated with a tab of the cartridge pivoted upward.
Figure 4:
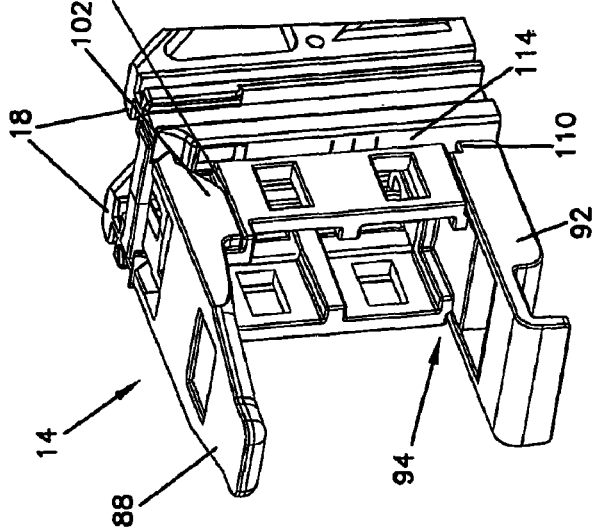
FIG. 4 is a front perspective view of one of the cartridges of the universal sliding adapter pack of FIG. 1, illustrated in a first position relative to two fixture brackets of the mounting fixture.
Figure 10:
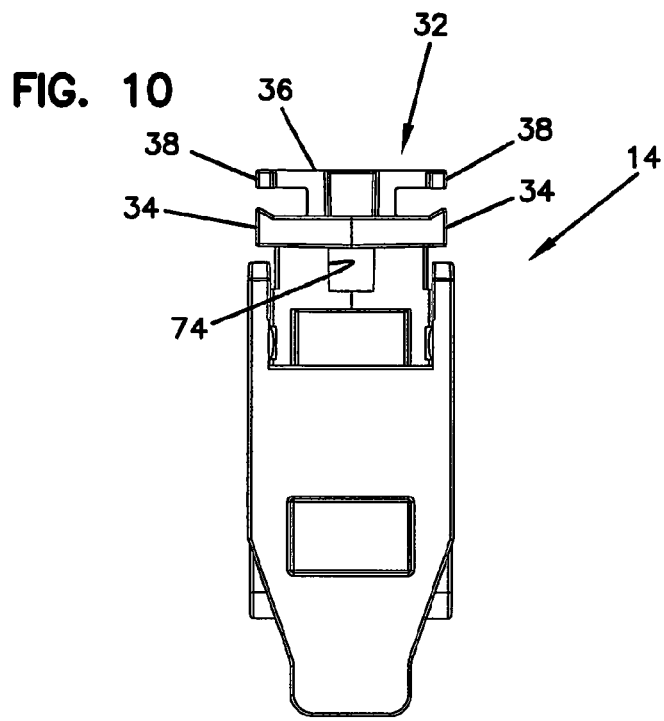
FIG. 10 is a top plan view of the cartridge of FIG. 8.

Referring to FIGS. 19-21, each of the adapter cage 28, the tab 88, and the base 92 is illustrated in isolation. The tab 88 (FIG. 20) has a first attachment end 96 and a second free end 98. In the illustrated embodiment, the tab 88 is pivotally attached to the adapter cage 28 at the top end 90 of the cage. Referring to FIGS. 4-6, each cartridge 14 slides from the first position to the second position by pulling the tab 88 upward.

Access to the adapters (e.g., 44, FIG. 2) mounted within the opening 40 of the adapter cage 28 is provided when the cartridge 14 is positioned in the second position. The second free end 98 of the tab 88 pivots away from the adapter cage 28 when pulled to provide access to the connector opening (e.g., 54) located nearest to the tab 88.

Referring still to FIGS. 4-6, in the first position (FIG. 4), the cartridge 14 is seated down within the mounting fixture and locked in place by way of the tab 88. In particular, in a tab-closed position, tab feet 102 rest upon shoulders 104 of the adapter cage 28 to retain the cage in the first position. To unlock the cartridge 14, the tab 88 is lifted upward (FIG. 5) whereby a projection 106 at the attachment end 96 of the tab 88 functions as a lever or cam to release the adapter cage 28. In particular, as the tab 88 is lifted, the projection 106 forcibly contacts an arcuate or ramped surface 108 (see also FIG. 3) of the upright member 24 on the bracket fixtures 18 to release the cartridge 14. The cartridge 14 can then be pulled upward to the second position to access the adapters.

In the second access position (FIG. 6), the cartridge 14 locks into place to prevent inadvertent separation of the cartridge 14 from the mounting fixture 12 (e.g., fixture brackets 18). In particular, the base 92 of the cartridge 14 is spring-loaded so that catches 110 located at the rear of the base 92 engage pockets 112 (see FIG. 3) formed in the upright members 24 of each one of the pair of fixture brackets 18. In the first position and during transition to the second position, the catches 110 of the spring-loaded base 92 rest upon and ride along a surface 114 of the upright member (see FIGS. 4 and 5, for example). When the cartridge 14 reaches the second position, the catches 110 automatically seat within the pockets 112.

Figure 26:
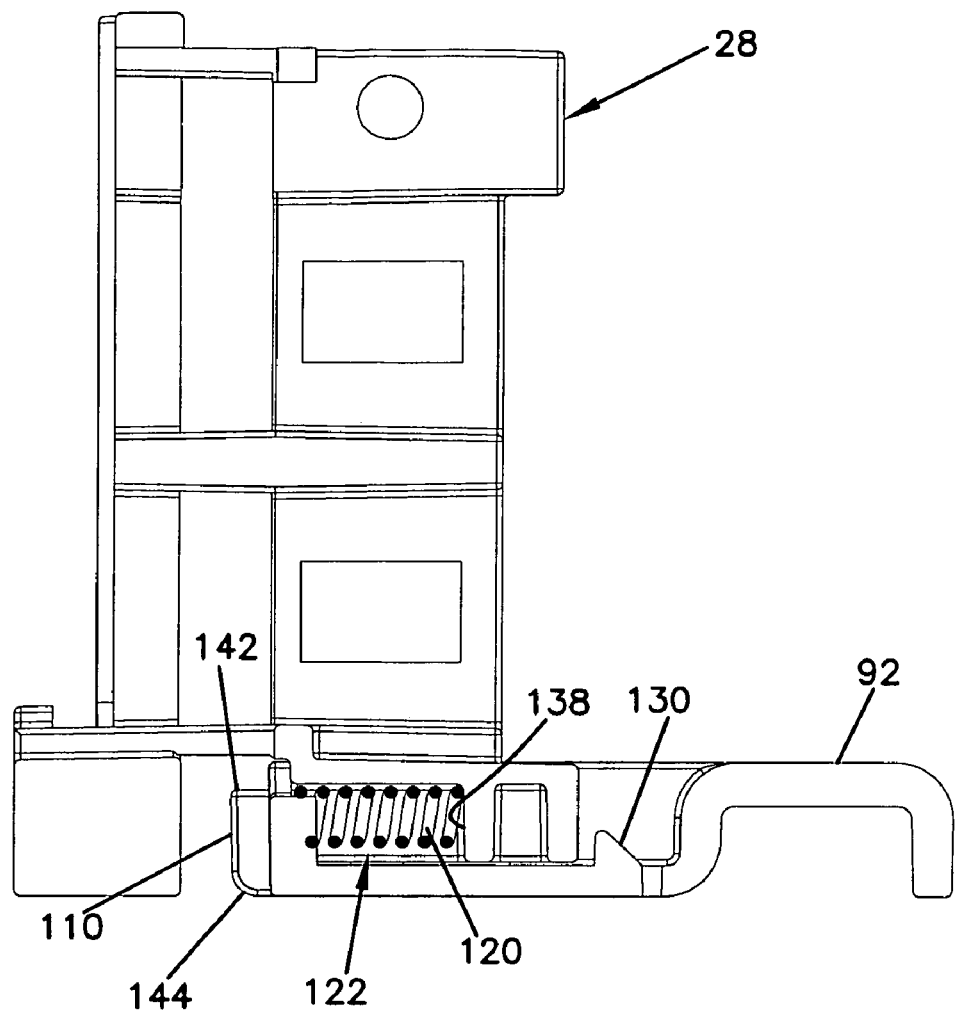
FIG. 26 is a cross-sectional side view of the base and adapter cage after being slid forward as illustrated in FIGS. 24 and 25.

Referring to FIG. 26, the base 92 of the cartridge 14 is illustrated in a position relative to the adapter cage at which the catches 110 are received within the pockets 112 of the fixture brackets (not shown in FIG. 26). The catches 110 of the base 92 include an upper edge 142 and a rounded lower edge or surface 144. Referring to FIG. 3, the pocket 112 of the upright member 24 is defined by an upper edge 116 and a lower ramped surface 118. The upper edges 142, 116 of the catches and pockets function as a positive stop that prevents the cartridge 14 from sliding further upward and separating from the fixture brackets 18. The rounded lower surface 144 of the catches 110 and the lower ramped surface 118 of the pockets 112 permits the catches 110 to unseat or disengage from the pockets 112 when the cartridge 14 is pushed down; the rounded lower surface 144 and the lower ramped surface 118 thereby allowing a user to easily return the cartridge 14 to the first position when access to the adapters is no longer needed.

Referring now to FIGS. 22-26, each cartridge 14 of the present sliding adapter pack 10 has a snap-fit construction that assembles without the use of a tool. The tool-free, snap-fit construction includes the adapter cage 28, the tab 88, and the base 92, and further includes the tool-free assembly of a spring 120 that provides for the spring action of the spring-loaded base 92.

To assemble the present universal cartridge 14, the spring 120 is placed within a pocket 122 (FIG. 22) formed in a bottom side of the adapter cage 28. The base 92 is then placed relative to the adapter cage 28 so that first tabs 124 (FIG. 21) of the base are located with notches 126 of slots 128 formed in the bottom of the adapter cage 28. The base 92 is then slid forward (FIGS. 24 and 25) relative to the adapter cage 28 to lock the base 92 to the adapter cage 28 and contain the spring 120 between the base and the adapter cage 28 as shown in FIG. 26. The base 92 locks into place by way of a flexible member 130 (FIGS. 25 and 26) that flexes downward when the first tabs 124 of the base 92 are placed within the notches 126 of the adapter cage 28, and that snaps back in place when the base 92 is slid forward relative to the cage 28.

When the base 92 slides forward, the first tabs 124 as well as second tabs 136 (FIG. 21) of the base 92 become trapped within the slots 128 formed in the bottom of the adapter cage 28. The slots 128 have a length the permit the tabs 124, 136 and the base 92 to move a pre-determined distance forward from the cage 28; however and referring to FIG. 26, the base 92 cannot move rearward beyond the stop defined by the flexible member 130. As can be understood and with reference to FIGS. 21 and 22, the forward-rearward direction of movement of the tabs 124, 136 and base 92 within the slots 128 permits the spring-loaded base 92 to rest upon and ride along the surface 114 of the fixture brackets 18, and seat with the pocket 112 of the fixture brackets 18, as previously described. Referring to FIG. 26, the spring-biasing force is created by compressing the spring 120 between an end 138 of the pocket 122 of the adapter cage 28 and a stop 140 (FIG. 21) formed on the base 92.

Referring back to FIGS. 19 and 20, the tab 88 of the cartridge 14 includes projections 132 that snap-fit to holes 134 formed in the adapter cage 28. In the alternative, the tab 88 can be formed with holes or openings and projections provided on the adapter cage 28. As has been described, the entire assembly of the present cartridge 14, as well as the loading of adapters (44, 46, 48, and 50) within the opening 40 of the cartridge, is completed without the use of tools.

The above specification provides a complete description of the present invention. Since many embodiments of the invention can be made without departing from the spirit and scope of the invention, certain aspects of the invention reside in the claims hereinafter appended.

What is claimed is:

1. A sliding adapter pack, comprising:
   a) a mounting fixture; and
   b) a plurality of cartridges mounted to the fixture, each cartridge being slidable relative to the fixture and independent of the other cartridges, each cartridge defining an opening sized to receive different types of adapters and attachment structure to which each different type of adapter secures;
   c) wherein the opening is sized to receive one quad LC adapter having four LC connector openings, the attachment structure including a first pair of apertures that receive flexible elements of the quad LC adapter to secure the quad LC adapter within the opening;
   d) wherein the opening is sized to receive two duplex LC adapters each having two LC connector openings, the attachment structure including a second pair of apertures that receives flexible elements of one of the two duplex LC adapters and a third pair of apertures that receives flexible elements of the other of the two duplex LC adapters;
   e) wherein the opening is sized to receive one duplex SC adapter having two SC connector openings, the first pair of apertures of the attachment structure receiving flexible elements of the duplex SC adapter to secure the duplex SC adapter within the opening; and
   f) wherein the opening is sized to receive two simplex SC adapters each having one SC connector openings, the second pair of apertures of the attachment structure receiving flexible elements of one of the two simplex SC adapters and the third pair of apertures of the attachment structure receiving flexible elements of the other of the two simplex SC adapters.

2. The adapter pack of claim 1, wherein each cartridge includes a tab pivotally attached to the adapter cage, wherein each cartridge slides from a first position to a second position by pulling the tab, access to adapters mounted within the opening of the adapter cage being provided when the cartridge is positioned in the second position.

3. The adapter pack of claim 2, wherein a free end of the tab pivots away from the adapter cage when pulled to provide access to the connector opening located closest to the tab.

4. The adapter pack of claim 2, wherein each cartridge further includes a base attached to the adapter cage at an end opposite the tab, the base being spring-loaded to lock the cartridge in the second position to prevent inadvertent separation of the cartridge from the mounting fixture.

5. The adapter pack of claim 4, wherein each cartridge is a snap-fit construction that assembles without the use of a tool, the snap-fit construction including the adapter cage, the tab, and the base.

6. The adapter pack of claim 5, wherein the attachment structure of the adapter cage provides for a snap-fit connection of each of the adapters received in the opening of the adapter cage.

* * * * *